United States Patent
Enyedy et al.

(10) Patent No.: US 8,964,026 B2
(45) Date of Patent: Feb. 24, 2015

(54) IMAGE-BASED MOTION CHARACTERIZATION SYSTEM FOR A MOBILE DEVICE

(75) Inventors: Edward A. Enyedy, Eastlake, OH (US); Robert J. Thayer, Lakewood, OH (US)

(73) Assignee: Lincoln Global, Inc., City of Industry, CA (US)

( * ) Notice: Subject to any disclaimer, the term of this patent is extended or adjusted under 35 U.S.C. 154(b) by 499 days.

(21) Appl. No.: 13/443,359

(22) Filed: Apr. 10, 2012

(65) Prior Publication Data

US 2013/0265416 A1    Oct. 10, 2013

(51) Int. Cl.
*H04N 7/18*    (2006.01)

(52) U.S. Cl.
USPC ..................... 348/135; 348/E7.085

(58) Field of Classification Search
CPC ...... G01B 11/022; G01B 11/024; H04N 7/18; H04N 7/181; G01C 15/00
See application file for complete search history.

(56) References Cited

U.S. PATENT DOCUMENTS

| | | | |
|---|---|---|---|
| 5,148,000 A | 9/1992 | Tews | |
| 5,571,431 A | 11/1996 | Lantieri et al. | |
| 5,875,664 A | 3/1999 | Scott et al. | |
| 5,932,123 A | 8/1999 | Marhofer et al. | |
| 6,230,072 B1 | 5/2001 | Powell et al. | |
| 6,583,386 B1 | 6/2003 | Ivkovich | |
| 6,617,548 B1 | 9/2003 | Bosio | |
| 6,757,008 B1 * | 6/2004 | Smith | 348/143 |
| 7,335,854 B2 | 2/2008 | Hutchison | |
| 7,734,358 B2 | 6/2010 | Watanabe et al. | |
| 7,873,495 B2 | 1/2011 | Lindell | |
| 2007/0056943 A1 | 3/2007 | Tenbrink | |
| 2009/0184098 A1 | 7/2009 | Daniel et al. | |
| 2009/0231423 A1 | 9/2009 | Becker et al. | |
| 2010/0100275 A1 | 4/2010 | Mian et al. | |
| 2010/0108654 A1 | 5/2010 | Ulrich et al. | |
| 2010/0224610 A1 | 9/2010 | Wallace | |
| 2011/0309063 A1 | 12/2011 | Ott et al. | |

FOREIGN PATENT DOCUMENTS

| | | |
|---|---|---|
| CN | 201313218 Y | 9/2009 |
| JP | 55073476 A | 6/1980 |

(Continued)

OTHER PUBLICATIONS

ESAB Welding Parameters Smartphone App; Reference location: http://www.esabna.com/us/en/news/Mobile-Applications-Guide.cfm#; Jun. 15, 2012; 1 page.

(Continued)

*Primary Examiner* — Dave Czekaj
*Assistant Examiner* — Nam Pham
(74) *Attorney, Agent, or Firm* — Hahn Loeser & Parks LLP; Brendan E. Clark

(57) ABSTRACT

Mobile devices and methods to facilitate the motion characterization of a welding element. A mobile device is used to capture video of a rotating welding element and the video is processed by a software application residing on the mobile device to determine a rate of rotation of the rotating welding element. The software application may perform further processing to determine a linear rate of motion as derived from the determined rate of rotation. The rate of rotation and/or the linear rate of motion may be displayed to a user of the mobile device on a display screen of the mobile device. Such methods may aid a user in calibrating a piece of welding equipment.

45 Claims, 8 Drawing Sheets

(56) References Cited

FOREIGN PATENT DOCUMENTS

| JP | 6238446 A | 8/1994 |
|---|---|---|
| JP | 2011007594 A | 1/2011 |
| WO | 2005113184 A1 | 12/2005 |

OTHER PUBLICATIONS

K283 Digital Wire Speed Meter; IM554, Jun. 2011; Operator's Instructions Sheets; 2 pages.

Lincoln Electric's CheckPoint™ Production Monitoring Software Delivers Key Weld Performance Information Anywhere, Anytime; Reference location: http://newsroom.lincolnelectric.com/images/9026/Checkpoint%20Release.pdf; 2011; 2 pages.

MotionPro!; Motion Analysis Software for All Sports; Reference location: http://www.motionprosoftware.com/[3/9/2012 8:50:00 AM]; 3 pages.

SpeedClock—Video Radar for iPhone 3GS, iPhone 4, IiPhone 4S, iPod touch (4th generation . . .; Reference location: http://itunes.apple.com/us/app/speedclock-video-radar/id400876654?mt=8; Jun. 15, 2012; 2 pages.

Welding Wire Speed Indicator; WeldingDIRECT.com; Reference location: http://weldingdirect.com/wirspeedin.html; Jun. 15, 2012; 1 page.

Wu et al. Vision-based measurement of weld pool geometry in contant-curren t gas tungsten arc welding; Reference location: http://www.engr.uky.edu/~ymzhang/Papers/Wu%20Post%20Paper%204.pdf; 2003; 4 pages.

Xiao-Dong Zhu et al.; Measurement Angular Velocity Based on Video Technology; 2011 4th International Congress on Image and Signal Processing; Oct. 15, 2011; pp. 1936-1940.

\* cited by examiner

US 8,964,026 B2

IMAGE-BASED MOTION CHARACTERIZATION SYSTEM FOR A MOBILE DEVICE

TECHNICAL FIELD

Certain embodiments of the present invention relate to mobile devices. More particularly, certain embodiments of the present invention relate to systems and methods to characterize the motion of welding components using a mobile device.

BACKGROUND

Tools are used for servicing and calibrating wire feeders and welding travel devices. A basic measurement that is performed when servicing wire feeders is that of measuring the wire feed speed. Measurement of wire feed speed can be performed using a traditional rpm (revolutions per minute) meter by placing the rpm meter on a rotating component and performing a calculation to convert expected wire feed speed to rpm. Some possible causes of incorrect or unexpected wire feed speed may include encoder/tachometer failure, worn brushes or commutator in a motor, stripped gears in a gearbox, wrong auxiliary gear installed, wrong gear selection set through software, and worn drive rollers. Furthermore, in certain welding applications, it is critical to have correct heat input to the weld. One of the factors that affects heat input is the travel speed of the device (e.g., a travel carriage) doing the welding. Simple and accurate measurement of wire feed speed and/or travel speed are highly desirable to allow for accurate and efficient calibration adjustments to be made and/or to help identify bad or worn components.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

Embodiments of the present invention facilitate the motion characterization of a welding element. The welding element may be, for example, a rotating drive roller of a welding wire feeder driving a welding wire. A mobile device (e.g., a smart phone with a video camera) is used to capture video of the rotating welding element and the video is processed by a software application residing on the mobile device to determine a rate of rotation (e.g., rotations per minute) of the rotating welding element. The software application may perform further processing to determine a linear rate of motion (e.g., a wire feed speed of a welding wire being fed by the rotating drive roller of a welding wire feeder) as derived from the determined rate of rotation. The rate of rotation and/or the linear rate of motion may be displayed to a user of the mobile device on a display screen of the mobile device. Such embodiments may aid a user in calibrating a piece of welding equipment, for example.

One embodiment of the present invention is a method implemented on a mobile device providing motion characterization functionality. The method includes acquiring video data of at least one rotating welding element via a video camera of the mobile device and processing the video data within the mobile device to determine a rate of rotation of the rotating welding element. The method may further include matching the video data to image data of a rotatable part stored within the mobile device, correlating the matching image data to dimension information of the rotatable part stored within the mobile device, and converting the rate of rotation to a linear rate of motion using the dimension information. Indications of the rate of rotation and/or the linear rate of motion may be displayed on a display screen of the mobile device.

Another embodiment of the present invention is a mobile device providing a motion characterization functionality. The mobile device includes a video camera operatively configured to acquire video data of at least one rotating welding element, a processing element, and a software application configured to operate on the processing element and process the video data to determine a rate of rotation of the rotating welding element. The mobile device may also include a display screen operatively configured to display information produced by the software application as the software application operates on the processing element. The mobile device may further include a user interface operatively configured to allow a user of the mobile device to input information to the mobile device. The software application may also be configured to receive dimension information associated with the rotating welding element, as input by a user of the mobile device via the user interface, and convert the rate of rotation to a linear rate of motion using the dimension information.

A further embodiment of the present invention is a non-transitory computer-readable medium having computer-executable instructions recorded thereon. The computer-readable instructions are capable of being executed by a processing element of a mobile device and providing a motion characterization functionality on the mobile device. The computer-readable instructions include instructions for acquiring video data of at least one rotating welding element via a video camera of the mobile device, and instructions for processing the video data within the mobile device to determine a rate of rotation of the rotating welding element. The computer-readable instructions may include instructions for receiving part identification information associated with the rotating welding element via a user interface of the mobile device, instructions for correlating the part identification information to dimension information associated with the rotating welding element stored within the mobile device, and instructions for converting the rate of rotation to a linear rate of motion using the dimension information. Examples of non-transitory computer-readable media include, but are not limited to, a CD-ROM, a removable flash memory card, a hard disk drive, a magnetic tape, and a floppy disk.

Details of illustrated embodiments of the present invention will be more fully understood from the following description and drawings.

DETAILED DESCRIPTION

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

The terms "mobile device" and "mobile phone" are used interchangeably herein. However, the term "mobile device" is not limited to a "mobile phone" herein. For example, a mobile device may be a tablet computer device or some other type of portable and/or hand-held device. The term "rate of rotation" is used broadly herein and can mean, for example, rotational speed, speed of revolution, angular speed, and angular velocity. Rate of rotation may be expressed in units of, for example, revolutions per minute, cycles per second, radians per second, or degrees per second. The term "linear rate of motion" is used broadly herein and can mean, for example, wire feed speed, travel speed, or velocity (e.g., the wire feed speed of a welding wire electrode, a travel speed of a welding carriage or tractor, a travel speed of a welding workpiece). As used herein, a welding workpiece is a piece to be welded or a piece that is being welded. Linear rate of motion may be expressed in units of, for example, centimeters per second or inches per minute.

Figure 1:
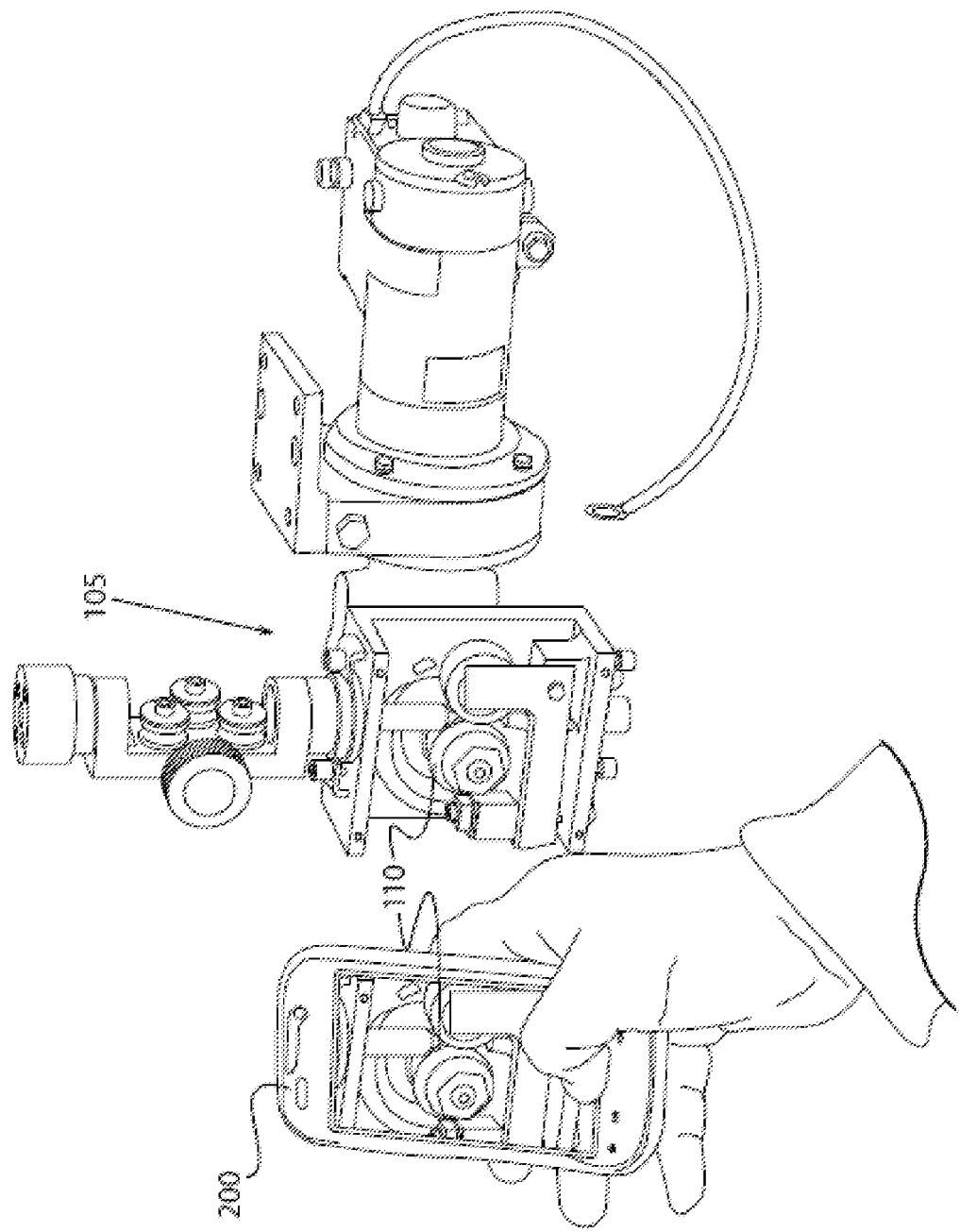
FIG. 1 illustrates a scenario of a user using a mobile device to capture video of a rotating welding element, in accordance with an embodiment of the present invention.

FIG. 1 illustrates a scenario of a user using a mobile device 200 to capture video of a rotating welding element 110, in accordance with an embodiment of the present invention. The mobile device 200 may be, for example, a mobile cellular telephone running a "smart phone" operating system. The rotating welding element 110 may be a drive roller of a welding wire feeder 105 for feeding a welding wire in a submerged arc welding system, for example. Other types of possible rotating welding elements include, but are not limited to, a drive roller of a welding gun, a drive roller of a drive system in a heated cabinet as used in a robotic welding application, a roller of a welding wire straightener located between a spool and a wire feeder, a roller of a welding carriage or tractor, a spool of welding wire, and a welding workpiece such as, for example, a rotating pipe.

Figure 2:
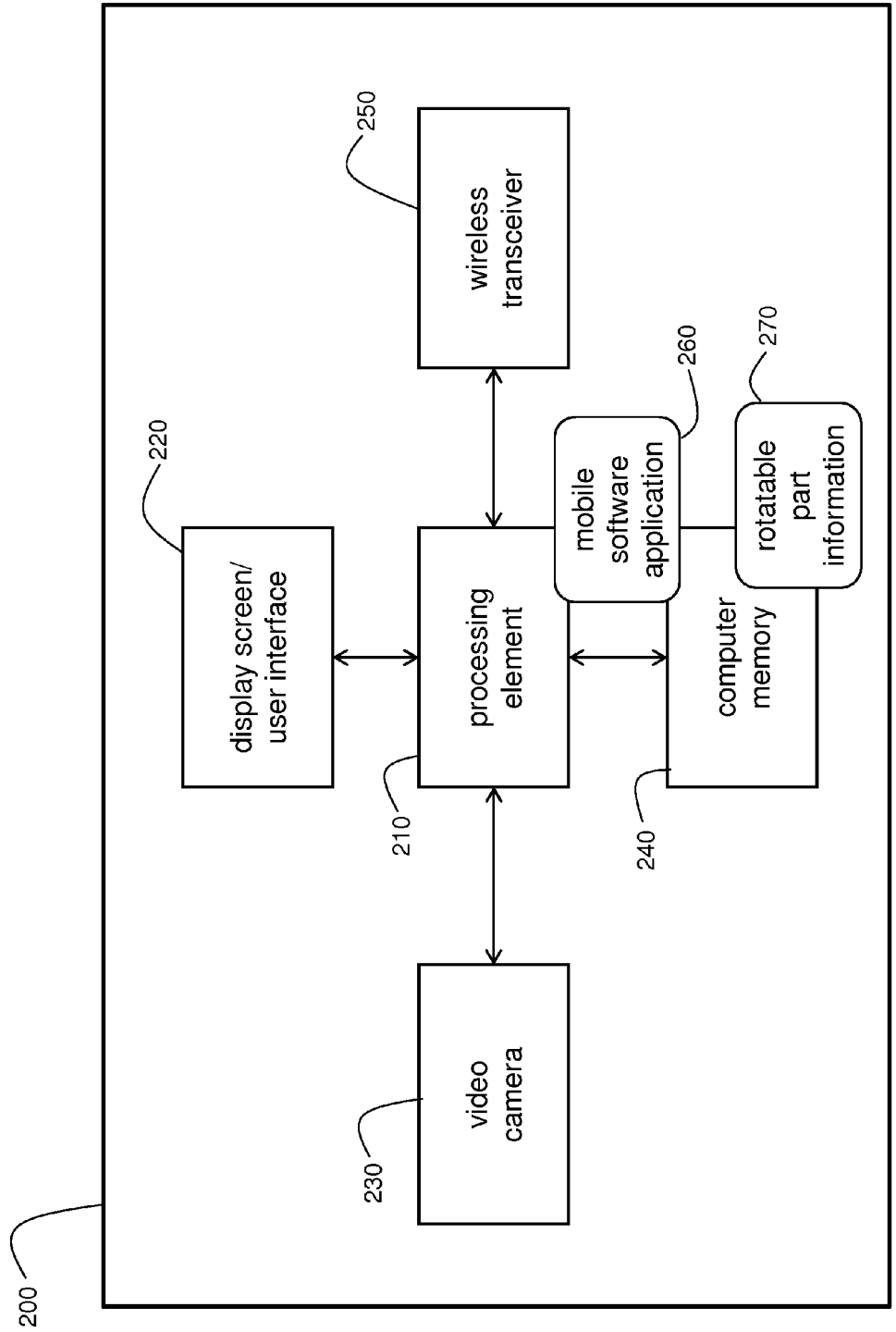
FIG. 2 illustrates a schematic block diagram of an exemplary embodiment of the mobile device of FIG. 1.

FIG. 2 illustrates a schematic block diagram of an exemplary embodiment of the mobile device 200 of FIG. 1. The mobile device 200 includes a processing element 210 such as, for example, a microprocessor. The mobile device 200 also includes a display screen 220, a video camera 230, computer memory 240, and a wireless transceiver 250, which are each in operable communication with the processing element 210. Some embodiments may not include the wireless transceiver 250, however.

In accordance with an embodiment, the user launches a motion characterization software application 260 on the mobile device 200 and points a video camera 230 of the mobile device 200 toward the rotating welding element 110 to capture video of the rotating welding element 110. The video of the rotating welding element may be displayed on a display screen 220 of the mobile device 200, as shown in FIG. 1. The software application 260 processes the video to determine a rate of rotation of the welding element 110, an indication of which may also be displayed on the display screen 220 of the mobile device 200. For example, the rate of rotation may be displayed as a number of revolutions per minute (rpm).

In accordance with an embodiment, the frame rate or sampling rate of the captured video is high enough, in relation to the rate of rotation of the welding element 110, such that temporal aliasing problems may be avoided and such that the rate of rotation may be accurately determined. For example, in some applications, a frame rate of 30 Hz may be adequate. In other applications, a frame rate in excess of 100 Hz may be needed.

In accordance with an embodiment of the present invention, the computer memory 240 stores the mobile software application 260 (i.e., a motion characterization software application) and images and/or a table of rotatable parts information 270. The processing element 210 is configured to access the mobile software application 260 and run the mobile software application 260 on the processing element. The mobile software application 260 performs the functions associated with characterizing the motion of a rotating welding element and any associated welding wire. The display screen 220, along with certain functionality of the mobile software application 260, may also serve as a user interface (e.g., a touch-activated display screen). As an alternative, a separate user interface (e.g., a keyboard) may be provided.

The mobile device 200 may employ one or more methodologies for characterizing the motion of a welding element, depending on the configuration of the mobile device 200 and of the mobile software application 260. Several exemplary embodiments of such methods are described below herein.

Figure 3:
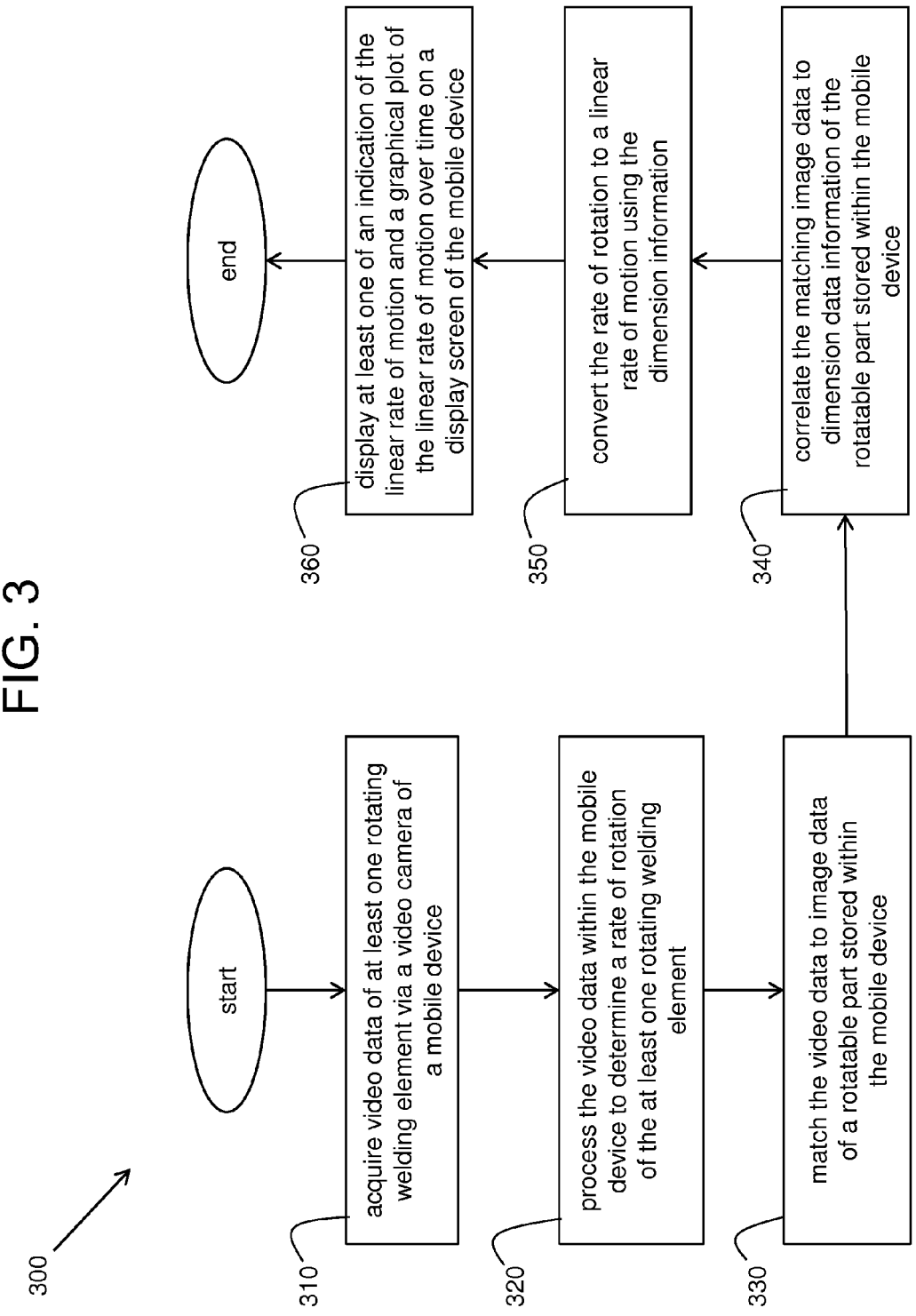
FIG. 3 is a flowchart of a first exemplary embodiment of a method implemented on the mobile device of FIG. 2 providing a motion characterization functionality.

FIG. 3 is a flowchart of a first exemplary embodiment of a method 300 implemented on the mobile device 200 of FIG. 2 providing a motion characterization functionality. In step 310 of the method 300, video data of at least one rotating welding element is acquired via a video camera 230 of the mobile device 200. The rotating welding element may be, for example, a drive roller of a welding wire feeder device. In step 320, the video data is processed within the mobile device 200 (via the mobile software application 260 operating on the processing element 210) to determine a rate of rotation of the at least one rotating welding element 110. For example, a feature of the rotating welding element (e.g., a tooth of the rotating welding element) may be tracked over multiple frames of the video data to determine the rate of rotation, based on knowing the frame rate of the video camera 230. Alternatively, the rotating welding element may be "marked" by a user with an indicia which can be readily tracked in the images of the video data. Again, the higher the frame rate, the more accurate will be the determination of the rate of rotation.

In step 330, the video data is matched to image data of a rotatable part stored within the mobile device 200 (e.g., using image or template matching techniques). The image data is a portion of the rotatable part information 270 stored in the computer memory 240 of the mobile device 200. In step 340 of the method 300, the matching image data is correlated to dimension information of the rotatable part stored within the mobile device 200. The dimension information is a portion of the rotatable part information 270 stored in the computer memory 240 of the mobile device 200 and may correspond to, for example, a diameter of the rotatable part. Image data and associated dimension information may be stored as a table in the computer memory 240 of the mobile device 200. In accordance with an alternative embodiment of the present invention, dimension information of the rotating welding element may be determined by further processing of the video data. Various processing techniques may be applied to estimate one or more dimensions (e.g., a diameter) of the rotating welding element.

In step 350, the determined rate of rotation of the rotating welding element 110 is converted to a linear rate of motion using the dimension information. The linear rate of motion may correspond to, for example, a wire feed speed (WFS) of a welding wire electrode being fed by the rotating welding element. In step 360, at least one of an indication of the linear rate of motion and a graphical plot of the linear rate of motion over time is displayed on a display screen 220 of the mobile device 200. In accordance with an embodiment of the present invention, the software application 260 may also compute and display a stability factor based upon, for example, the variation of the rate of rotation (or the linear rate of motion) as compared to the average rate of rotation (or the average linear rate of motion).

As an example, if a drive roller of a wire feeder rotates at a rate of X rotations per minute (rpm) and has a diameter of D, the resulting linear rate of motion of a welding wire being driven by the roller (i.e., the wire feed speed) is determined as WFS=X*(πD), since one rotation corresponds to the circumference of the drive roller. For example, if the rate of rotation X is 15 rpm and the diameter D is 2 cm, then the resulting wire feed speed (WFS) would be:

$$WFS = (15)*(2)*(\pi) \text{ cm/minute,}$$
$$= 15*(2\pi)/60 \text{ cm/second,}$$
$$= 1.57 \text{ cm/second.}$$

The rate of rotation of 15 rpm can be expressed as 0.25 rotations per second or 0.25 Hz. To avoid temporal aliasing problems, the acquisition frame rate of the video camera should be at least twice this rate or 0.50 Hz. However, a typical video camera frame rate of 30 Hz or 60 Hz would not only avoid any temporal aliasing problems, but may also allow for a more accurate determination of the rate of rotation.

Figure 4:
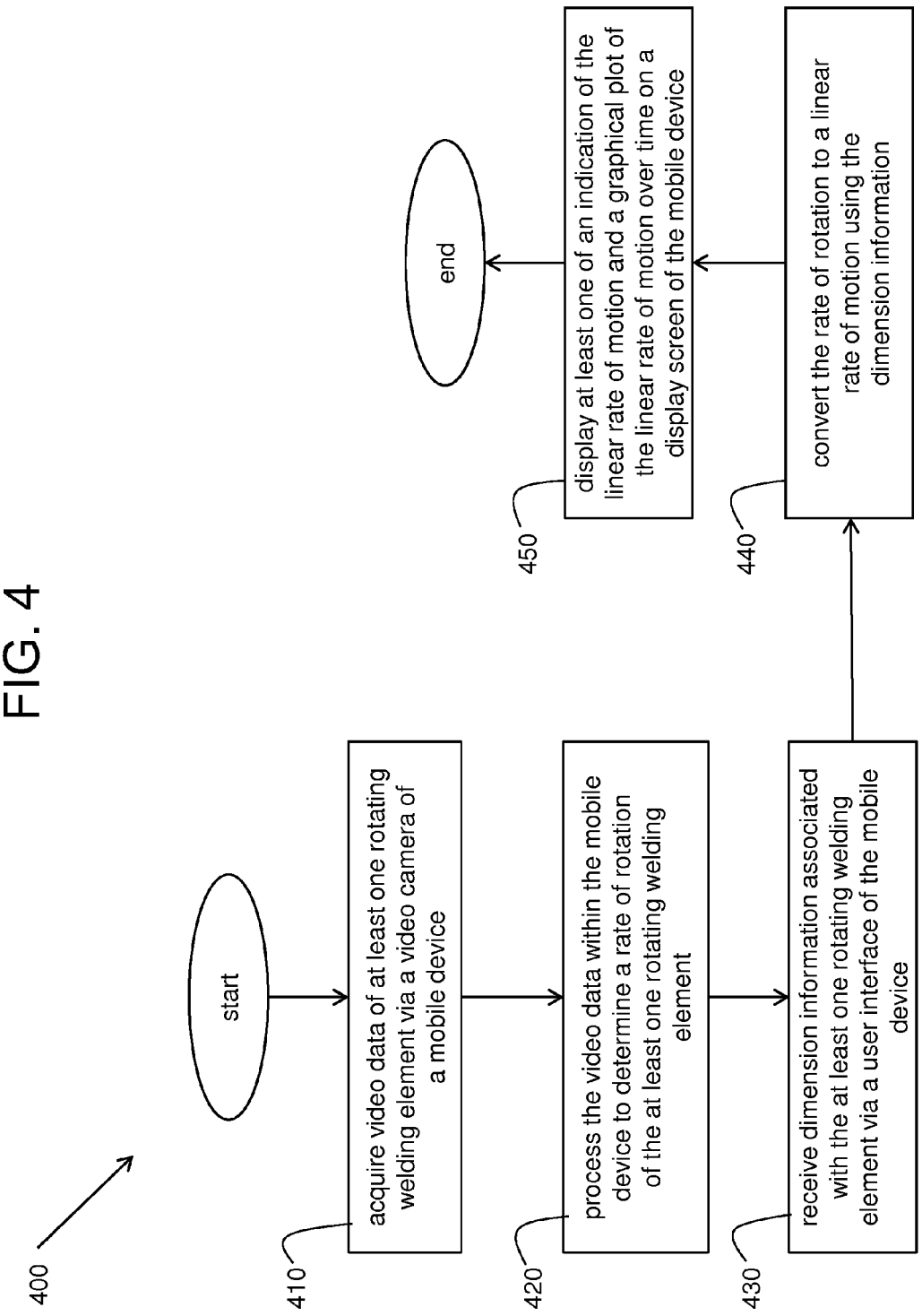
FIG. 4 is a flowchart of a second exemplary embodiment of a method implemented on the mobile device of FIG. 2 providing a motion characterization functionality.

FIG. 4 is a flowchart of a second exemplary embodiment of a method 400 implemented on the mobile device 200 of FIG. 2 providing a motion characterization functionality. In step 410 of the method 400, video data of at least one rotating welding element is acquired via a video camera 230 of the mobile device 200. For example, the rotating element may be part of a welding carriage or tractor to move the welding carriage or tractor along a welding path. In step 420, the video data is processed within the mobile device 200 (via the mobile software application 260 operating on the processing element 210) to determine a rate of rotation of the at least one rotating welding element.

In step 430, dimension information associated with the at least one rotating welding element is received via a user interface 220 of the mobile device 200. For example, the dimension information may be input by a user of the mobile device 200 based on knowledge of the rotating welding element and may correspond to, for example, radius information of the rotating welding element. In step 440 of the method 400, the determined rate of rotation of the rotating welding element is converted to a linear rate of motion using the received dimension information. The linear rate of motion may correspond to, for example, a travel speed of a welding carriage or tractor being driven by the rotating welding element. In step 450, at least one of an indication of the linear rate of motion and a graphical plot of the linear rate of motion over time is displayed on a display screen 220 of the mobile device 200.

Figure 5:
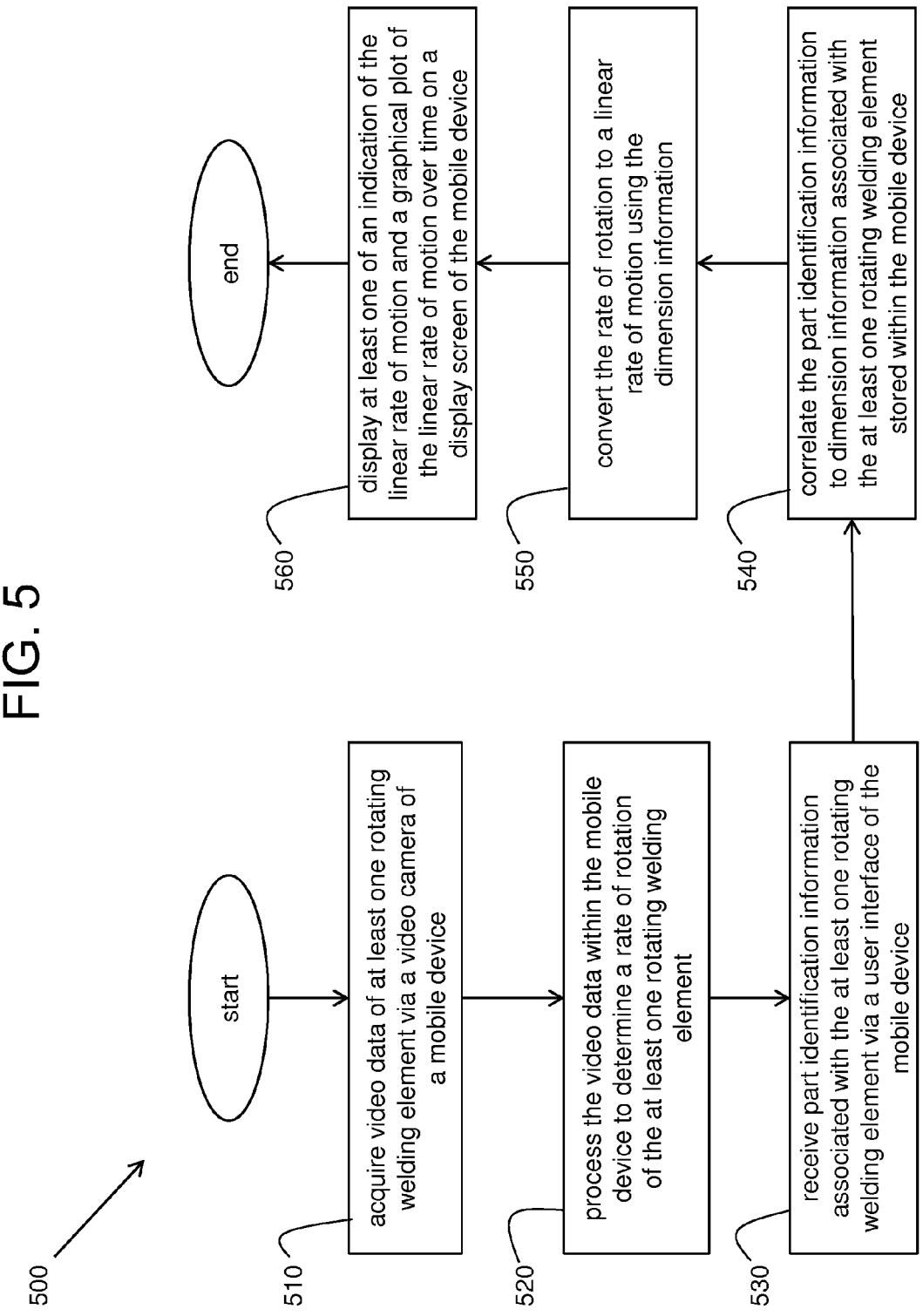
FIG. 5 is a flowchart of a third exemplary embodiment of a method implemented on the mobile device of FIG. 2 providing a motion characterization functionality.

FIG. 5 is a flowchart of a third exemplary embodiment of a method 500 implemented on the mobile device 200 of FIG. 2 providing a motion characterization functionality. In step 510 of the method 500, video data of at least one rotating welding element is acquired via a video camera 230 of the mobile device 200. For example, the rotating welding element may be a drive roller of a welding gun. In step 520, the video data is processed within the mobile device 200 (via the mobile software application 260 operating on the processing element 210) to determine a rate of rotation of the at least one rotating welding element. In step 530, part identification information associated with the at least one rotating welding element is received via a user interface 220 of the mobile device 200. For example, the part identification information may be input by a user of the mobile device 200 based on knowledge of the rotating welding element.

In step 540, the part identification information is correlated to dimension information associated with the at least one rotating welding element stored within the mobile device 200 (e.g., a table of part identification vs. dimension information may be stored as rotatable part information 270 in the computer memory 240 of the mobile device). The dimension information may correspond to, for example, circumference information of the rotating welding element. In step 550, the determined rate of rotation of the rotating welding element is converted to a linear rate of motion using the correlated dimension information. The linear rate of motion may correspond to, for example, a push speed of a welding wire being fed through a welding gun by the rotating welding element (i.e., the drive roller of the welding gun). In step 560, at least one of an indication of the linear rate of motion and a graphical plot of the linear rate of motion over time is displayed on a display screen 220 of the mobile device 200.

Figure 6:
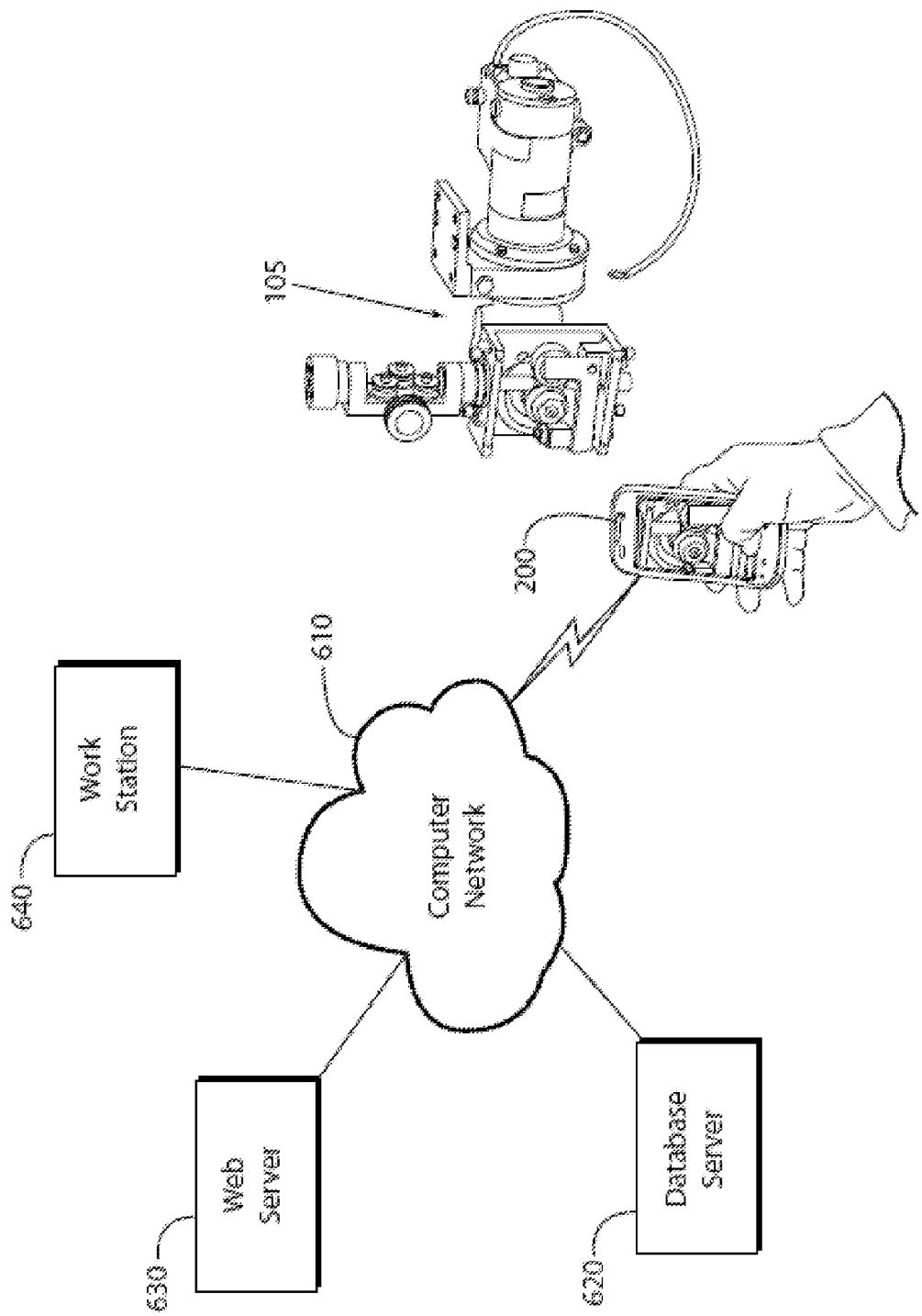
FIG. 6 illustrates a scenario of a user using the wireless capability of the mobile device of FIG. 2 to search a computer network for matching image information and/or dimension information of rotatable parts, in accordance with an embodiment of the present invention.

FIG. 6 illustrates a scenario of a user using the wireless capability of the mobile device of FIG. 2 (via the wireless transceiver 250) to search a computer network 610 for matching image information and/or dimension information of rotatable parts, in accordance with an embodiment of the present invention. The computer network 610 may be a local area network (LAN), a wide area network (WAN), or the internet, for example, in accordance with various embodiments of the present invention. The wireless capability supported by the wireless transceiver 250 may correspond to any of a number of possible wireless technologies including, but not limited to, Bluetooth, Infrared Data Association (IrDA), HomeRF, Shared Wireless Access Protocol (SWAP), Wireless Fidelity (Wi-Fi), and 3G or 4G Long-Term Evolution (LTE) mobile technology.

The computer network 610 may be capable of being in operative communication with several types of computer network devices storing image and/or dimension information of rotatable parts. For example, the computer network 610 may have access to a database server 620, a web server 630, and/or a workstation computer 640. Methods of using the wireless capability of the mobile device 200 to search a computer network 610 for matching image information and/or dimension information of rotatable parts are described herein below.

Figure 7:
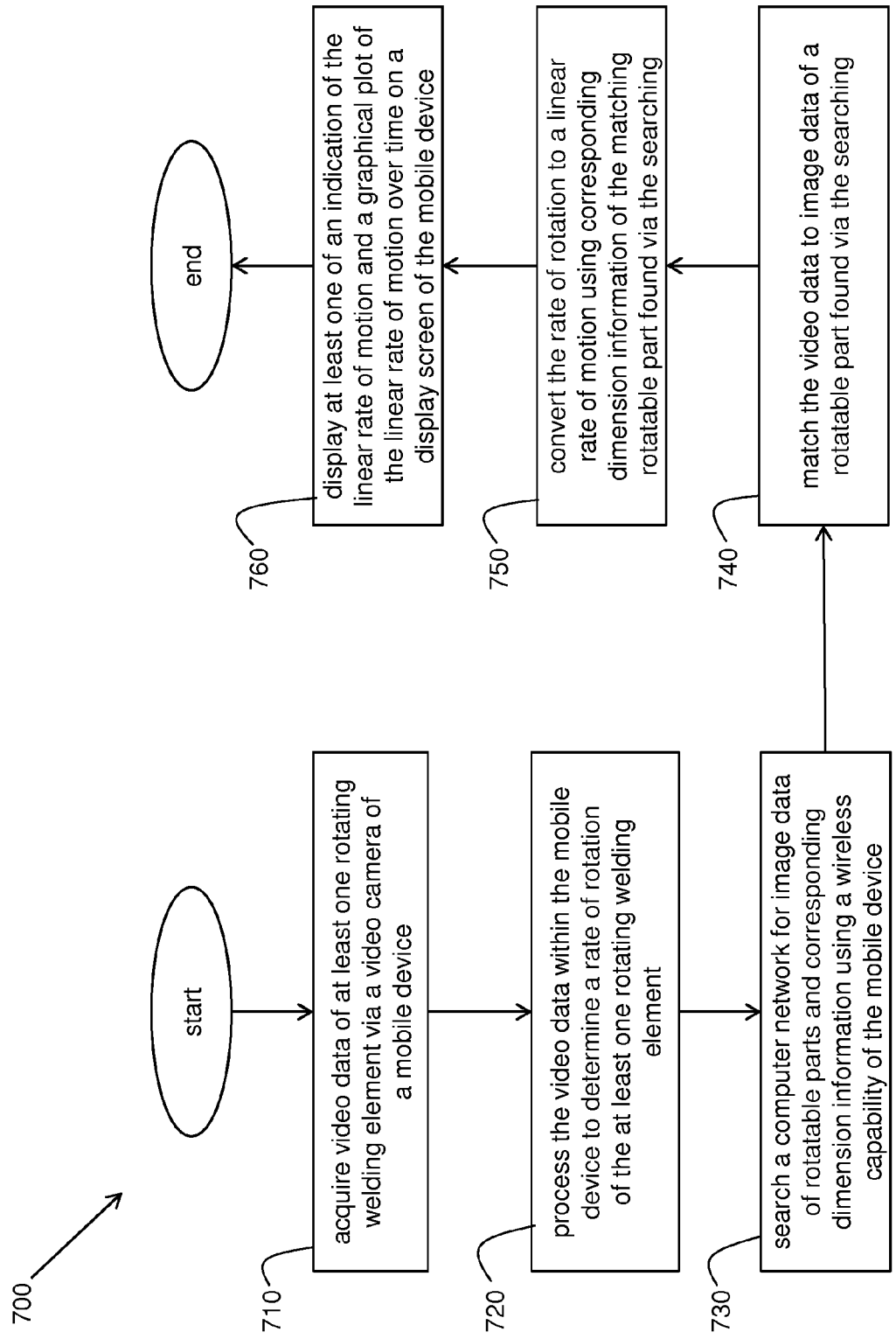
FIG. 7 is a flowchart of a fourth exemplary embodiment of a method implemented on the mobile device of FIG. 2 providing a motion characterization functionality.

FIG. 7 is a flowchart of a fourth exemplary embodiment of a method 700 implemented on the mobile device 200 of FIG. 2 providing a motion characterization functionality. In step 710 of the method 700, video data of at least one rotating welding element (e.g., a roller of a welding wire straightener) is acquired via a video camera 230 of the mobile device 200. In step 720, the video data is processed within the mobile device 200 to determine a rate of rotation of the at least one rotating welding element. In step 730, a computer network 610 is searched for image data of rotatable parts and corresponding dimension information using a wireless capability of the mobile device 200.

In step 740 of the method 700, the video data is matched to image data of a rotatable part found via the search (e.g., using image or template matching techniques). In step 750, the rate of rotation is converted to a linear rate of motion (e.g., a speed of a wire through the wire straightener) using the corresponding dimension information of the matching rotatable part found via the search. In step 760, at least one of an indication of the linear rate of motion and a graphical plot of the linear rate of motion over time is displayed on a display screen 220 of the mobile device 200.

As an example, the database server 620 (see FIG. 6) may store many searchable examples of common rotatable wire straightener parts, the web server 630 may provide many searchable examples of common rotatable wire feeder parts, and the work station 640 may store many searchable examples of common rotatable welding gun parts. In accordance with an embodiment, the mobile software application 260 may be programmed to "know" that the database server 620, the web server 630, and the work station 640 are primary resources to be searched on the computer network 610.

Figure 8:
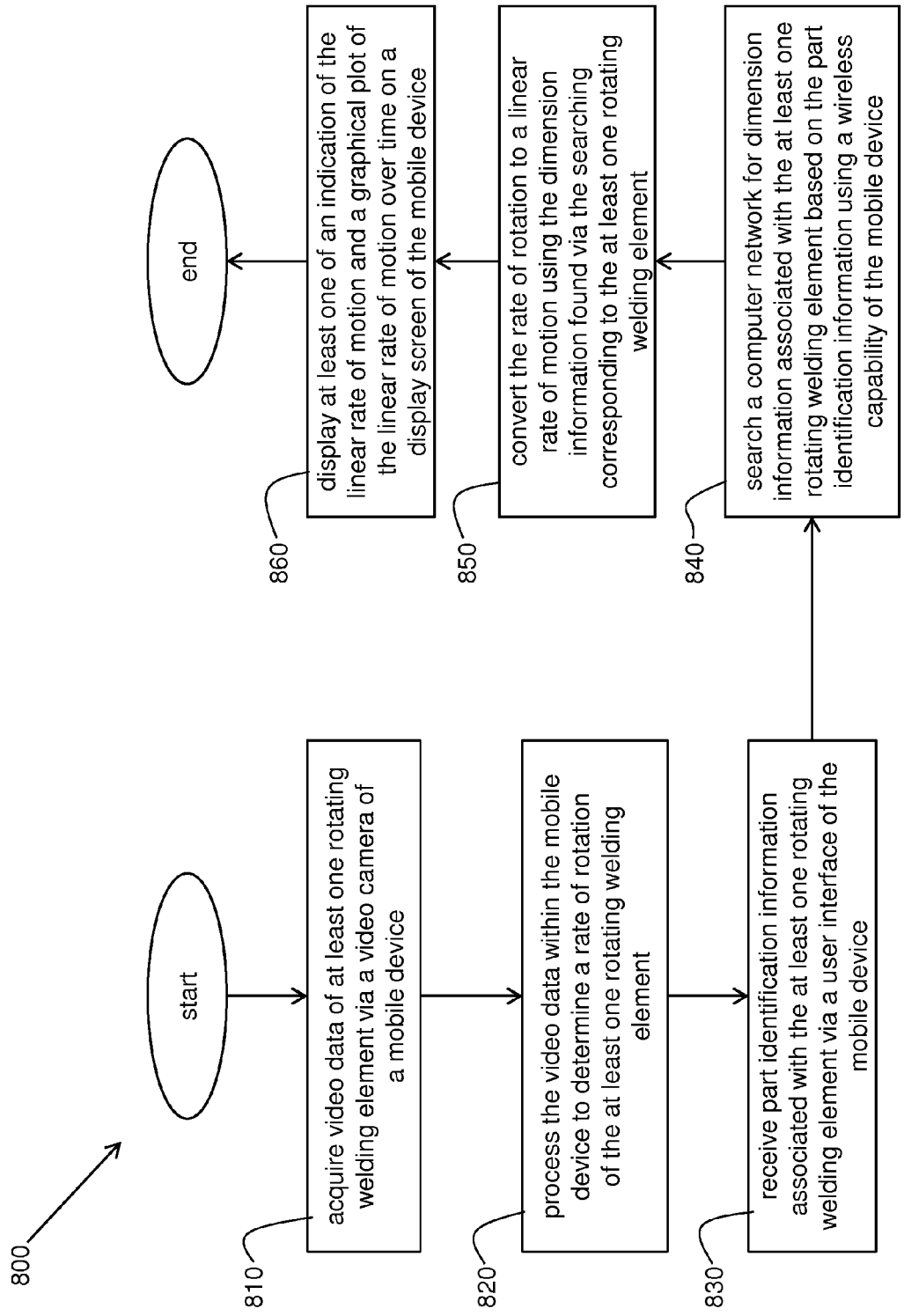
FIG. 8 is a flowchart of a fifth exemplary embodiment of a method implemented on the mobile device of FIG. 2 providing a motion characterization functionality.

FIG. 8 is a flowchart of a fifth exemplary embodiment of a method 800 implemented on the mobile device 200 of FIG. 2 providing a motion characterization functionality. In step 810 of the method 800, video data of at least one rotating welding element (e.g., a drive roller of a drive system in a heated cabinet) is acquired via a video camera 230 of the mobile device 200. In step 820, the video data is processed within the mobile device 200 to determine a rate of rotation of the at least one rotating welding element. In step 830, part identification information associated with the at least one rotating welding element is received via a user interface 220 of the mobile device 200. For example, the user may enter the part identification information via the user interface 220.

In step 840 of the method 800, a computer network is searched for dimension information associated with the at least one rotating welding element based on the part identification information using a wireless capability of the mobile device 200. In step 850, the rate of rotation is converted to a linear rate of motion using the dimension information found via the search corresponding to the at least one rotating welding element. In step 860, at least one of an indication of the linear rate of motion and a graphical plot of the linear rate of motion over time is displayed on a display screen 220 of the mobile device 200.

As an example, the work station 640 (see FIG. 6) may store many searchable examples of common drive rollers by part number. In accordance with an embodiment, the mobile software application 260 may be programmed to "know" that the work station 640 is a primary resource to be searched on the computer network 610 for part numbers and associated dimension information of drive rollers.

In summary, mobile devices and methods to facilitate the motion characterization of a welding element are disclosed. A mobile device is used to capture video of a rotating welding element (e.g., a drive roller of a wire feeder) and the video is processed by a software application residing on the mobile device to determine a rate of rotation of the rotating welding element. The software application may perform further processing to determine a linear rate of motion (e.g., a wire feed speed of a driven welding wire) as derived from the determined rate of rotation. The rate of rotation and/or the linear rate of motion may be displayed to a user of the mobile device on a display screen of the mobile device. Such methods may aid a user in calibrating a piece of welding equipment.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A method implemented on a mobile device providing a motion characterizing functionality, said method comprising:
    acquiring video data of at least one rotating welding element via a video camera of said mobile device, wherein said at least one rotating welding element includes at least one of a drive system in a cabinet, a roller of a wielding wire straightener, a roller of a wielding carriage or tractor, a spool of wielding wire, and welding workpiece;
    tracking at least one feature of the rotation welding element over multiple frames of the video data;
    processing said video data within said mobile device to determine a rate of rotation of the at least one rotating welding element based on said tracking; and
    displaying an indication of said rate of rotation on a display of said mobile device.

2. The method of claim 1, further comprising:
    matching said video data to image data of a rotatable part stored within said mobile device;
    correlating said matching image data to dimension information of the rotatable part stored within said mobile device; and
    converting said rate of rotation to a linear rate of motion using said dimension information.

3. The method of claim 2, further comprising displaying at least one of an indication of said linear rate of motion and a graphical plot of said linear rate of motion over time on a display of said mobile device.

4. The method of claim 2, wherein said linear rate of motion corresponds to at least one of a wire feed speed of a welding wire, a travel speed of a welding carriage or tractor, and a travel speed of a welding workpiece.

5. The method of claim 1, further comprising:
receiving dimension information associated with the at least one rotating welding element via a user interface of said mobile device; and
converting said rate of rotation to a linear rate of motion using said dimension information.

6. The method of claim 5, further comprising displaying at least one of an indication of said linear rate of motion and a graphical plot of said linear rate of motion over time on a display of said mobile device.

7. The method of claim 5, wherein said linear rate of motion corresponds to at least one of a wire feed speed of a welding wire, a travel speed of a welding carriage or tractor, and a travel speed of a welding workpiece.

8. The method of claim 1, further comprising:
receiving part identification information associated with the at least one rotating welding element via a user interface of said mobile device;
correlating said part identification information to dimension information associated with the at least one rotating welding element stored within said mobile device; and
converting said rate of rotation to a linear rate of motion using said dimension information.

9. The method of claim 8, further comprising displaying at least one of an indication of said linear rate of motion and a graphical plot of said linear rate of motion over time on a display of said mobile device.

10. The method of claim 8, wherein said linear rate of motion corresponds to at least one of a wire feed speed of a welding wire, a travel speed of a welding carriage or tractor, and a travel speed of a welding workpiece.

11. The method of claim 1, further comprising:
searching a computer network for image data of rotatable parts and corresponding dimension information using a wireless capability of said mobile device;
matching said video data to image data of a rotatable part found via said searching; and
converting said rate of rotation to a linear rate of motion using corresponding dimension information of the matching rotatable part found via said searching.

12. The method of claim 11, further comprising displaying at least one of an indication of said linear rate of motion and a graphical plot of said linear rate of motion over time on a display of said mobile device.

13. The method of claim 11, wherein said linear rate of motion corresponds to at least one of a wire feed speed of a welding wire, a travel speed of a welding carriage or tractor, and a travel speed of a welding workpiece.

14. The method of claim 1, further comprising:
receiving part identification information associated with the at least one rotating welding element via a user interface of said mobile device;
searching a computer network for dimension information associated with the at least one rotating welding element based on said part identification information using a wireless capability of said mobile device;
converting said rate of rotation to a linear rate of motion using said dimension information found via said searching corresponding to the at least one rotating welding element.

15. The method of claim 14, further comprising displaying at least one of an indication of said linear rate of motion and a graphical plot of said linear rate of motion over time on a display of said mobile device.

16. The method of claim 14, wherein said linear rate of motion corresponds to at least one of a wire feed speed of a welding wire, a travel speed of a welding carriage or tractor, and a travel speed of a welding workpiece.

17. A mobile device providing a motion characterizing functionally, said mobile device comprising:
a video camera operatively configured to acquire video data of at least one rotating welding element, wherein said at least one rotating welding element includes at least one of a drive roller of a welding wire feeder, a drive roller of a welding gun, a drive roller of a drive system in a cabinet, a roller of a welding wire straightener, a roller of a welding carriage or tractor, a spool of welding wire, and a welding workpiece;
a processing element;
a software application configured to operate on said processing element for tracking at least one figure of the rotating welding element over multiple frames of the video data, and for processing said video data to determine a rate of rotation of the at least one rotating welding element based on said tracking;
a display screen operatively configured to display information produced by said software application as said software application operates on said processing element; and
a user interface operatively configured to allow a user of said mobile device to input information to said mobile device.

18. The mobile device of claim 17, further comprising a computer memory for storing at least computer-readable instructions of said software application and information corresponding to a plurality of rotatable parts.

19. The mobile device of claim 17, wherein said software application is further configured to:
match said video data to image data of a rotatable part stored within said mobile device;
correlate said matching image data of the rotatable part to dimension information of the rotatable part stored within said mobile device; and
convert said rate of rotation to a linear rate of motion using said dimension information.

20. The mobile device of claim 19, wherein said linear rate of motion corresponds to at least one of a wire feed speed of a welding wire, a travel speed of a welding carriage or tractor, and a travel speed of a welding workpiece.

21. The mobile device of claim 17, wherein said software application is further configured to:
receive dimension information associated with the at least one rotating welding element, as input by a user of said mobile device, via said user interface; and
convert said rate of rotation to a linear rate of motion using said dimension information.

22. The mobile device of claim 21, wherein said linear rate of motion corresponds to at least one of a wire feed speed of a welding wire, a travel speed of a welding carriage or tractor, and a travel speed of a welding workpiece.

23. The mobile device of claim 17, wherein said software application is further configured to:
receive part identification information associated with the at least one rotating welding element, as input by a user of said mobile device, via said user interface;
correlate said part identification information to dimension information associated with the at least one rotating welding element stored within said mobile device; and
convert said rate of rotation to a linear rate of motion using said dimension information.

24. The mobile device of claim 23, wherein said linear rate of motion corresponds to at least one of a wire feed speed of a welding wire, a travel speed of a welding carriage or tractor, and a travel speed of a welding workpiece.

25. The mobile device of claim 17, further comprising a wireless transceiver.

26. The mobile device of claim 25, wherein said software application is further configured to:
  search a computer network for image data of rotatable parts and corresponding dimension information via said wireless transceiver;
  match said video data to image data of a rotatable part found as a result of said search; and
  convert said rate of rotation to a linear rate of motion using corresponding dimension information of the matching rotatable part found as a result of said search.

27. The mobile device of claim 26, wherein said linear rate of motion corresponds to at least one of a wire feed speed of a welding wire, a travel speed of a welding carriage or tractor, and a travel speed of a welding workpiece.

28. The mobile device of claim 25, wherein said software application is further configured to:
  receive part identification information associated with the at least one rotating welding element, as input by a user of said mobile device, via said user interface of said mobile device;
  search a computer network for dimension information associated with the at least one rotating welding element based on said part identification information using said wireless transceiver of said mobile device; and
  convert said rate of rotation to a linear rate of motion using dimension information found as a result of said search corresponding to the at least one rotating welding element.

29. The mobile device of claim 28, wherein said linear rate of motion corresponds to at least one of a wire feed speed of a welding wire, a travel speed of a welding carriage or tractor, and a travel speed of a welding workpiece.

30. A non-transitory computer-readable medium having computer-executable instructions recorded thereon, said computer-executable instructions capable of being executed by a processing element of a mobile device and providing a motion characterization functionality on the mobile device, said instruction comprising:
  instructions for acquiring video data of at least one rotating welding element via a video camera of said mobile device, wherein said at least one rotating welding element includes at least one of a drive roller of a welding wire feeder, a drive roller of a welding gun, a drive roller of a drive system in a cabinet, a roller of a welding wire straightener, a roller of a welding a carriage or tractor, a spool of welding wire, and a welding workpiece;
  instructions for tracking at least one feature of the rotating welding element over multiple frames of the video data;
  instructions for processing said video data within said mobile device to determine a rate of rotation of said at least one rotating welding element based on said tracking; and
  instructions for displaying an indication of said rate of rotation on a display of said mobile device.

31. The non-transitory computer-readable medium of claim 30, wherein the instructions further comprise instructions for:
  matching said video data to image data of a rotatable part stored within the mobile device;
  correlating said matching image data to dimension information of the rotatable part stored within the mobile device; and
  converting said rate of rotation to a linear rate of motion using said dimension information.

32. The non-transitory computer-readable medium of claim 31, wherein the instructions further comprise instructions for displaying at least one of an indication of said linear rate of motion and a graphical plot of said linear rate of motion over time on a display of said mobile device.

33. The non-transitory computer-readable medium of claim 31, wherein said linear rate of motion corresponds to at least one of a wire feed speed of a welding wire, a travel speed of a welding carriage or tractor, and a travel speed of a welding workpiece.

34. The non-transitory computer-readable medium of claim 30, wherein the instructions further comprise instructions for:
  receiving dimension information associated with the at least one rotating welding element via a user interface of the mobile device; and
  converting said rate of rotation to a linear rate of motion using said dimension information.

35. The non-transitory computer-readable medium of claim 34, wherein the instructions further comprise instructions for displaying at least one of an indication of said linear rate of motion and a graphical plot of said linear rate of motion over time on a display of said mobile device.

36. The non-transitory computer-readable medium of claim 34, wherein said linear rate of motion corresponds to at least one of a wire feed speed of a welding wire, a travel speed of a welding carriage or tractor, and a travel speed of a welding workpiece.

37. The non-transitory computer-readable medium of claim 30, wherein the instructions further comprise instructions for:
  receiving part identification information associated with the at least one rotating welding element via a user interface of the mobile device;
  correlating said part identification information to dimension information associated with the at least one rotating welding element stored within the mobile device; and
  converting said rate of rotation to a linear rate of motion using said dimension information.

38. The non-transitory computer-readable medium of claim 37, wherein the instructions further comprise instructions for displaying at least one of an indication of said linear rate of motion and a graphical plot of said linear rate of motion over time on a display of said mobile device.

39. The non-transitory computer-readable medium of claim 37, wherein said linear rate of motion corresponds to at least one of a wire feed speed of a welding wire, a travel speed of a welding carriage or tractor, and a travel speed of a welding workpiece.

40. The non-transitory computer-readable medium of claim 30, wherein the instructions further comprise instructions for:
  searching a computer network for image data of rotatable parts and corresponding dimension information using a wireless capability of said mobile device;
  matching said video data to image data of a rotatable part found via said searching; and
  converting said rate of rotation to a linear rate of motion using corresponding dimension information of the matching rotatable part found via said searching.

41. The non-transitory computer-readable medium of claim 40, wherein the instructions further comprise instructions for displaying at least one of an indication of said linear rate of motion and a graphical plot of said linear rate of motion over time on a display of said mobile device.

42. The non-transitory computer-readable medium of claim 40, wherein said linear rate of motion corresponds to at least one of a wire feed speed of a welding wire, a travel speed of a welding carriage or tractor, and a travel speed of a welding workpiece.

43. The non-transitory computer-readable medium of claim 30, wherein the instructions further comprise instructions for:
- receiving part identification information associated with the at least one rotating welding element via a user interface of said mobile device;
- searching a computer network for dimension information associated with the at least one rotating welding element based on said part identification information using a wireless capability of said mobile device; and
- converting said rate of rotation to a linear rate of motion using dimension information found via said searching corresponding to the at least one rotating welding element.

44. The non-transitory computer-readable medium of claim 43, wherein the instructions further comprise instructions for displaying at least one of an indication of said linear rate of motion and a graphical plot of said linear rate of motion over time on a display of said mobile device.

45. The non-transitory computer-readable medium of claim 43, wherein said linear rate of motion corresponds to at least one of a wire feed speed of a welding wire, a travel speed of a welding carriage or tractor, and a travel speed of a welding workpiece. ,

* * * * *